United States Patent [19]

Lindmark

[11] 4,097,773
[45] Jun. 27, 1978

[54] SWITCHED MODE POWER SUPPLY

[76] Inventor: Magnus Carl Wilhelm Lindmark, Vasavagen 9, Stocksund, Sweden, S-182 74

[21] Appl. No.: 737,511

[22] Filed: Nov. 1, 1976

[30] Foreign Application Priority Data

Nov. 3, 1975 Sweden .................................. 7512267

[51] Int. Cl.² ........................ H03K 17/04; H03K 1/12
[52] U.S. Cl. ................................ 307/296 A; 307/295; 307/246
[58] Field of Search .................... 307/296, 295, 246

[56] References Cited

U.S. PATENT DOCUMENTS

| 3,080,534 | 3/1963 | Paynter | 307/296 X |
| 3,496,386 | 2/1970 | Holloman | 307/296 X |
| 3,683,208 | 8/1972 | Burens | 307/296 |

FOREIGN PATENT DOCUMENTS 1,763,941  11/1971  Germany.

Primary Examiner—John S. Heyman
Attorney, Agent, or Firm—Alfred E. Miller

[57] ABSTRACT

A switched mode power supply includes a pair of capacitors serially connected across a supply input and a pair of switching transistors serially connected across the supply input. The output load circuit is connected between the junction of the capacitors and the junction of the transistors by way of a series conductor. A capacitor is connected in parallel with the load and a further capacitor, which may consitute stray capacitance, is also connected between the junctions of the transistors and the junctions of the capacitors.

6 Claims, 3 Drawing Figures

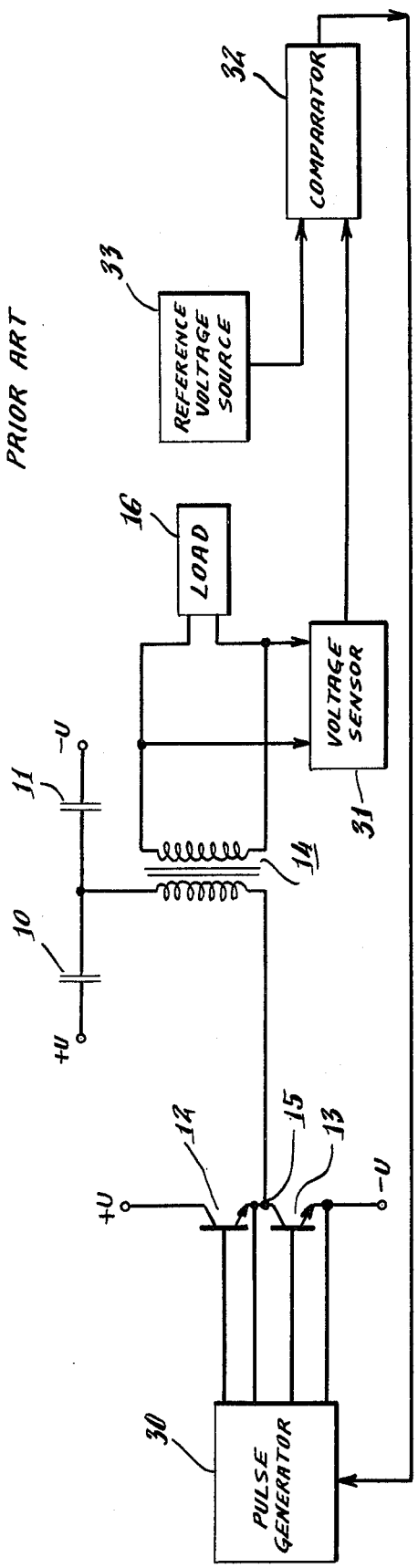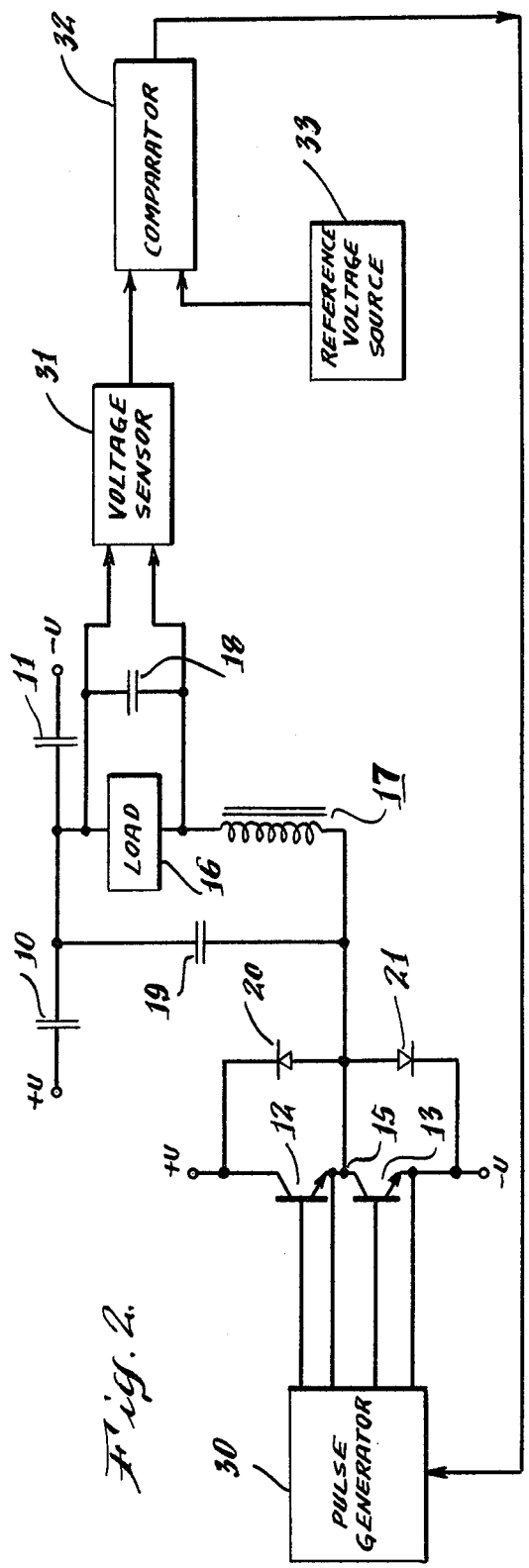

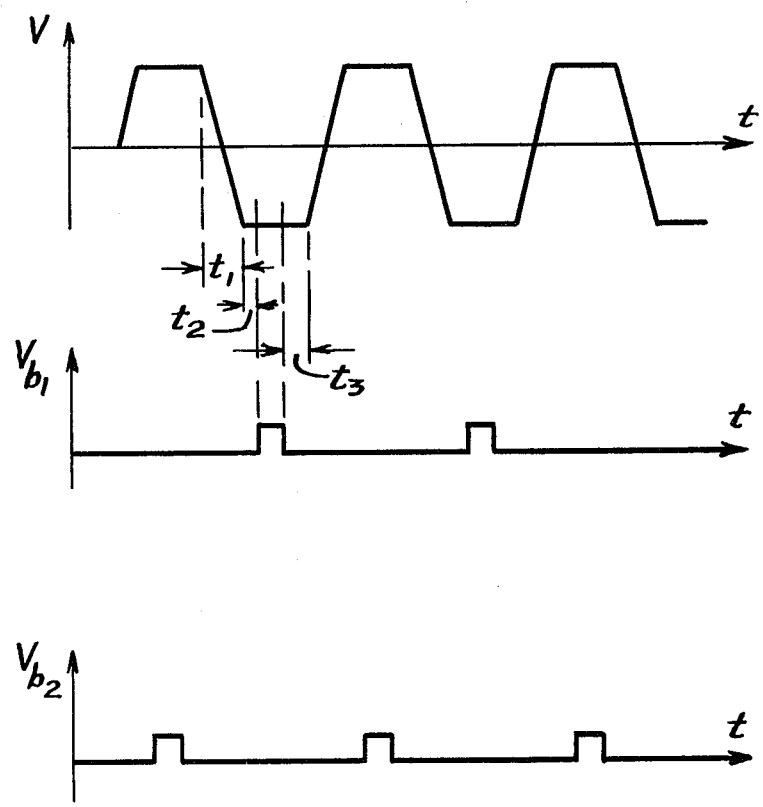

SWITCHED MODE POWER SUPPLY

BACKGROUND OF THE INVENTION

This invention relates to a switched mode power supply of the type in which the supply input is fed to a parallel combination of two series connected capacitors and two series connected transistors. In this type of circuit, the output is derived at the junctions between the capacitors and transistors.

Known switched mode power supplies of this kind usually are restricted to operate with a maximum switching frequency of about 20 kHz due to losses in the switching transistors and radio frequency (RF) interference.

The object of this invention is to provide a switched mode power supply which can operate with a considerably higher switching frequency, for example, at about 200 kHz. According to the invention, this is achieved by connecting the series combination of an inductor and a load between the common connection of the capacitors and the common connection of the transistors.

In a preferred embodiment of the invention a third capacitor is connected across the series combination of the inductor and the load. A fourth capacitor may be connected in parallel with the load.

The invention permits the use of switching frequencies of 200 kHz or more. As a result, smaller and cheaper components may be employed. In addition, the power supply may have a much shorter response time, i.e. a shorter time is required for the supply to react and compensate for changes of the load or of the input.

In order that the invention will be more thoroughly understood, it will now be disclosed in greater detail with reference to the accompanying drawings, wherein:

FIG. 1 is a circuit diagram of a known switched mode power supply;

FIG. 2 is a circuit diagram of a switched mode power supply according to the invention; and FIG. 3 shows a voltage waveform and the corresponding control pulses of the power supply of FIG. 2.

DESCRIPTION OF THE PREFERRED EMBODIMENT

FIG. 1 shows the circuit of a conventional switched mode power supply. The d.c. mains supply $+U$, $-U$ is connected across two series connected capacitors 10, 11 and two series connected transistors 12, 13. The primary winding of a transformer 14 is connected between the common connection of the capacitors 10, 11 and the common connection 15 between the emitter of transistor 12 and the collector of transistor 13. The transistors are switched on and off alternately usually at a frequency of about 20 kHz, in conventional manner by a pulse generator 30 of known construction. Switching of the transistors creates an alternating current through the primary winding of transformer 14. Assuming that transistor 12 is switched off after having been on for some time, the potential of the common connection 15, which had been $+U$ volts, tends to decrease to zero due to the power consumed in a load 16 connected to the secondary winding of transformer 14. If transistor 13 now is switched on, the potential of connection 15 will change to $-U$ volts. The output of the power supply is usually controlled by driving the transistors with pulses of fixed width but of variable repetition rate. The circuit arrangement for controlling the output may consist of any suitable circuit 31 for sensing the output voltage, a conventional comparing circuit 32 for comparing it with a reference voltage source 33. The difference voltage is applied to the generator 30 for varying the repetition rate of the control pulses as a function of the output voltage and hence to control the repetition rate of switching of the transistors to maintain the desired output.

In power supplies of the above type, switching must occur in such a way that the potential at connection 15 changes between $+U$ volts and $-U$ volts as quickly as possible in order to limit the power dissipation of the transistors. This rapid change of potential gives rise to voltage waveforms with steep ramps, which in turn cause high frequency waves in the RF range.

The requirement of limiting the power dissipation of the switching transistors and the requirement of avoiding excessive RF interference both set a limit to the switching frequency of about 20 kHz. This repetition rate is high enough that it is not audible while still being low enough to fulfill these requirements.

FIG. 2 shows an embodiment of a circuit according to the present invention. The arrangement of capacitors 10, 11 and transistors 12, 13 is the same as in the circuit of FIG. 1, but the transformer 14 is replaced by a different circuit arrangement comprising an inductor 17 in series with the load 16. The load is bridged by a capacitor 18, and a further capacitor 19 is in parallel with circuit elememts 16, 17, 18. Diodes 20, 21 are connected between the emitter and collector of the transistors 12 and 15 respectively.

The circuit of FIG. 2 operates in the following way.

As in the known circuit, only one transistor is on at a time. Assuming that transistor 12 has been on and is switched off, the potential of the connection 15 will decrease from $+U$ volts to $-U$ volts depending on the inductor 17, which resists all changes of its current and consequently reverses its polarity when transistor 12 is switched off. This means that the potential of connection 15 is changed to $-U$ volts without the aid of transistor 13, which still is cut off. This allows capacitor 19 to be dimensioned to give the potential at connection 15 comparatively slow-rising voltage flanks, thereby reducing strong harmonics and consequently the RF interference. Capacitor 19 usually is a separate capacitor but may in certain cases consist entirely of the stray capacitances of the circuit.

Since the load 16 is in series with the inductor 17, a capacitor 18 is arranged in parallel to the load to act as a "phase compensator," i.e. inductor 17 and capacitor 18 form a series resonance circuit. The power fed to the load 16 may be controlled by changing the repetition rate of the control pulses fed to the bases of the transistors, as in known systems. In the circuit of FIG. 2, a change in repetition rate towards the resonance frequency of the series circuit 17, 18 corresponds to power at the load 16.

The diodes 20, 21 are flywheel diodes for the inductor 17. In the above example, transistor 13 obviously must be switched on before the major part of the power of the inductor 17 has been dissipated by the circuit including the diode 21. Thus, the time $t_2$ must not be too large.

FIG. 3 shows the potential V at the connection 15 in FIG. 2 as well as the control pulses $V_{b1}$, $V_{b2}$ of the transistors 12, 13 respectively. The slow transistor or rise time of said voltage is indicated by $t_1$. As is clearly obvious from the figure, the control pulses do not occur until after the potential at connection 15 has fully reversed. Due to the residual collector current of the transistors (caused by the base charge), the voltage does not again change until some time $t_3$ after the switching off of the respective control pulse. When the frequency of the control pulses is changed in order to control the voltage output, the width of the control pulses must be changed proportionally more than the frequency due to this residual current. This may, of course, be effected in conventional manner in the pulse generator 30.

While the invention has been disclosed and described with reference to a single embodiment, it will be apparent that variations and modifications may be made therein and it is intended in the following claim to cover each such variation and modification as follows within the true spirit and scope of the invention.

What is claimed is:

1. In a switched mode power supply having a pair of supply voltage terminals, a pair of transistors having their emitter-collector paths connected in series to said terminals, first and second capacitors connected in series between said terminals, a series circuit of a load circuit and an inductor connected between the junction of said first and second capacitors and the junction of said emitter-collector paths, and a source of control pulses connected to the basis of said transistors; the improvement wherein said source of control pulses is connected to render said transistors conductive on alternate pulses, and further comprising a third capacitor connected in parallel with said load circuit and forming a series resonant circuit in combination with said inductor at a frequency substantially equal to the pulse repetition frequency of said control pulses of said source of pulses, whereby back e.m.f. of said inductor at the time of switching off of each of said transistors reduces the emitter-collector voltage of the other transistor at the switch on time of said other transistor.

2. The switched mode power supply of claim 1 further comprising a fourth capacitor connected in parallel with said series circuit of said load circuit and said inductor.

3. The switched mode power supply of claim 2 wherein said fourth capacitor comprises the stray capacitance of said series connected inductor and load circuit.

4. The switched mode power supply of claim 1 further comprising a separate fly-wheel diode connected in parallel with the emitter-collector paths of each of said transistors.

5. The switched mode power supply of claim 1 further comprising means responsive to a voltage at said load circuit for controlling said control pulses.

6. The switched mode power supply of claim 5 wherein said means responsive to said output circuit voltage comprises means for simultaneously controlling the frequency of said control pulses and the pulse width of said control pulses, whereby residual current caused by base charges of said transistors is compensated.

* * * * *